(12) United States Patent
Chomel et al.

(10) Patent No.: US 9,061,458 B2
(45) Date of Patent: Jun. 23, 2015

(54) METHOD AND DEVICE FOR FORMING CONTAINERS WITH LOCALIZED COOLING

(75) Inventors: Nicolas Chomel, Octeville sur Mer (FR); Sylvain Auvray, Octeville sur Mer (FR); Jean-Christophe Langlois, Octeville sur Mer (FR); Arnaud Briard, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 430 days.

(21) Appl. No.: 13/132,486

(22) PCT Filed: Dec. 1, 2009

(86) PCT No.: PCT/FR2009/001363
§ 371 (c)(1),
(2), (4) Date: Aug. 24, 2011

(87) PCT Pub. No.: WO2010/063899
PCT Pub. Date: Jun. 10, 2010

(65) Prior Publication Data
US 2011/0298163 A1    Dec. 8, 2011

(30) Foreign Application Priority Data
Dec. 3, 2008   (FR) ...................................... 08 06794

(51) Int. Cl.
| | |
|---|---|
| *B29C 49/10* | (2006.01) |
| *B29C 49/48* | (2006.01) |
| *B29C 49/64* | (2006.01) |
| *B29K 67/00* | (2006.01) |

(52) U.S. Cl.
CPC ............. *B29C 49/4802* (2013.01); *B29C 49/64* (2013.01); *B29C 2049/4807* (2013.01); *B29C 2049/4812* (2013.01); *B29K 2067/00* (2013.01)

(58) Field of Classification Search
None
See application file for complete search history.

(56) References Cited

U.S. PATENT DOCUMENTS

| | | | | |
|---|---|---|---|---|
| 3,949,034 | A | * | 4/1976 | Uhlig ............................ 264/530 |
| 4,769,206 | A | | 9/1988 | Reymann et al. |
| 6,074,596 | A | | 6/2000 | Jacquet |
| 2006/0113709 | A1 | * | 6/2006 | Hirano et al. .............. 264/328.1 |

FOREIGN PATENT DOCUMENTS

| | | |
|---|---|---|
| EP | 0 888 864 A1 | 1/1999 |
| EP | 1 116 572 A1 | 7/2001 |
| EP | 1 314 535 A1 | 5/2003 |
| FR | 2 591 142 A | 6/1987 |
| GB | 1 493 639 A | 11/1977 |
| WO | 2007/020346 A1 | 2/2007 |

* cited by examiner

*Primary Examiner* — Monica Huson
(74) *Attorney, Agent, or Firm* — Sughrue Mion, PLLC

(57) ABSTRACT

A forming method, in a mold fitted with a wall forming a cavity, of a container from an intermediate container including at least one lateral protrusion projecting toward the exterior of the container. The method includes a boxing operation of pushing back the lateral protrusion in order to form, by turning it around an articulation zone, a hollow reserve projecting toward the interior of the container and a local cooling operation, after turning the protrusion over, of sweeping a circulation fluid over the articulation zone.

14 Claims, 5 Drawing Sheets

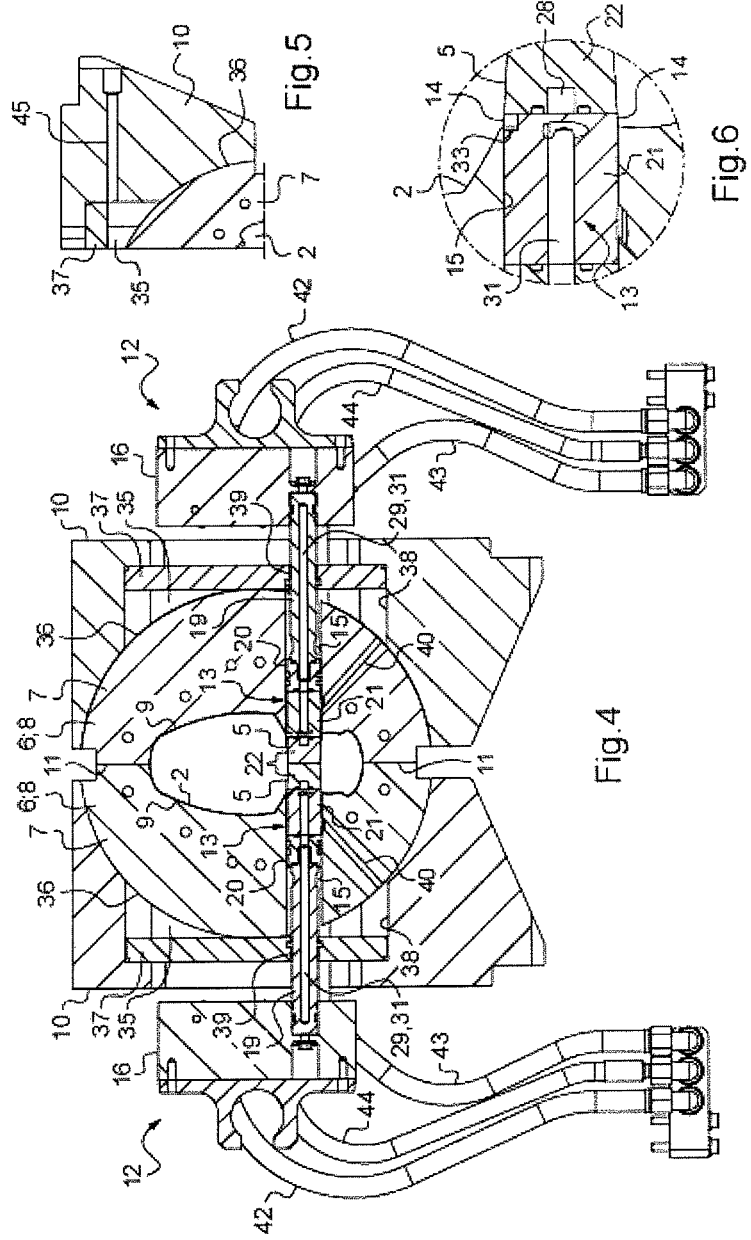

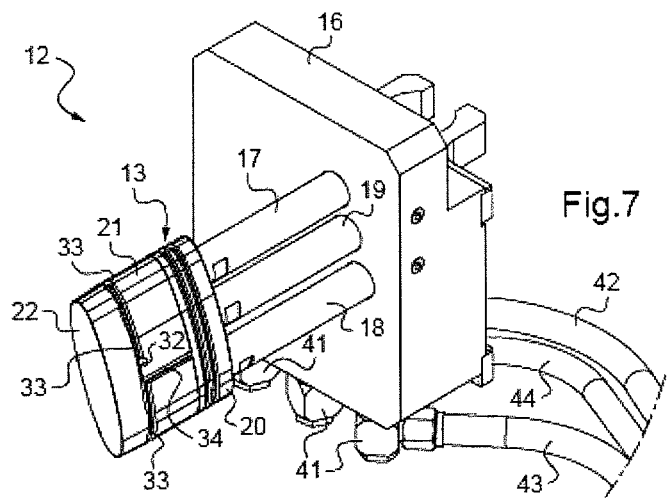
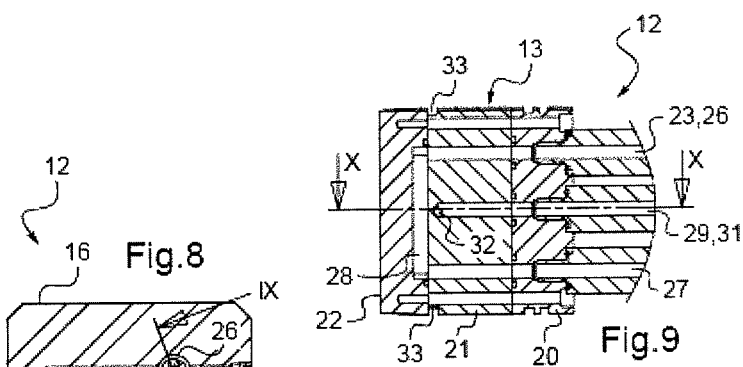
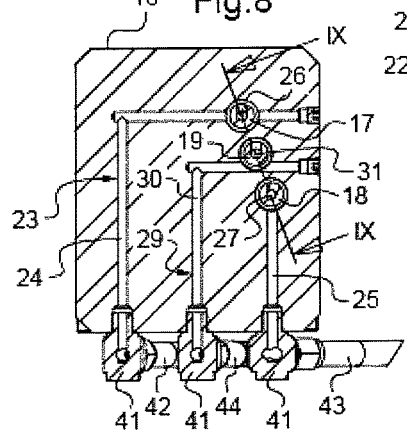

US 9,061,458 B2

METHOD AND DEVICE FOR FORMING CONTAINERS WITH LOCALIZED COOLING

CROSS REFERENCE TO RELATED APPLICATIONS

This application is a National Stage of International Application No. PCT/FR2009/001363, filed Dec. 1, 2009, claiming priority based on French patent application Ser. No. 08/06794, filed Dec. 3, 2008, the contents of all of which are incorporated herein by reference in their entirety.

The invention concerns the forming of containers from blanks made of thermoplastic material, and more specifically the forming of containers fitted with hollow reserves such as integrated handles.

By way of review, the manufacture of containers generally comprises a blowing operation that takes place in a mold, the wall of which defines a cavity into which the blank is inserted; during blowing, the blank presses against the wall under the effect of the high gaseous pressure in the blank, previously heated to allow its plastic deformation.

Some containers can be fitted with hollow reserves that are formed to project toward the interior of the container and are produced for purposes such as aesthetics (such as the creation of curves), structural (for example to produce panels intended to absorb the deformation of the container during hot filling) or functional (to produce a handle for gripping the container).

There are several techniques for forming a hollow reserve on a container.

A first technique consists of using a mold fitted with a movable insert initially retracted into the wall of the mold and deployed when the container is present during formation in the mold in order to push back the material when it reaches the wall, as is illustrated in European patent applications EP 1 922 256 (SIDEL) or EP 345 518 (TOAGOSEI).

A disadvantage of this technique is related to the thermal regulation of the mold, which is generally shortened in order to initiate the cooling of the container before it is ejected from the mold.

Indeed, this cooling of the material makes its deformation more difficult when the insert is deployed. In particular, it can occur that insufficiently deformed material does not press completely against the surface of the insert. The result can be certain defects of appearance that would justify the rejection of the container.

A second technique consists of forming an intermediate container fitted with a protrusion that projects toward the exterior of the container, by means of a mold fitted with a recess to form this protrusion during the blowing of the container. The intermediate container thus formed is then removed from the mold. An additional step then consists of pushing back the protrusion, for example by means of a sliding rod, in order to turn it over around an articulation zone so as to form a hollow reserve projecting toward the interior of the container. In particular, this technique is illustrated in international application WO 2006/014331.

To a certain degree this technique remedies the previously mentioned disadvantages for the first technique described above, because essentially the hollow reserve is formed at the same time as the rest of the container, which facilitates deformation of the material. However, it is not without its own disadvantages. Indeed, the intermediate container undergoes a cooling, first in contact with the mold and then when removed therefrom, which causes its rigidification. This can make the operation of turning the protrusion over tricky because in some cases it can cause the appearance of incipient cracks in the articulation zone.

The invention in particular seeks to remedy the disadvantages of the previous techniques by proposing a solution to facilitate the forming of containers fitted with hollow reserves.

To that end, the invention first proposes a method of forming, in a mold fitted with a wall forming a cavity, a container from an intermediate container comprising at least one lateral protrusion projecting toward the exterior of the container, which comprises:

A boxing operation consisting of pushing back the lateral protrusion in order to form, by turning it over around an articulation zone, a hollow reserve projecting toward the interior of the container;

A local cooling operation, after turning the protrusion over, consisting of sweeping a circulation fluid over the articulation zone.

Secondly, the invention proposes a device for forming a container from an intermediate container comprising at least one lateral protrusion projecting toward the exterior of the container, said device comprising:

A mold fitted with a wall defining a cavity;

A boxing insert movably mounted with respect to the mold between a retracted position in which the insert is retracted into the wall and a deployed position in which the insert protrudes with respect to the wall, toward the interior of the cavity, to push back, on the intermediate container, the lateral protrusion and to form, by turning it over around an articulation zone, a hollow reserve toward the interior of the container;

a peripheral groove that is formed on the insert and which, in the deployed position of the insert, is located facing said articulation zone;

means of injecting a fluid into said peripheral groove;

means of extracting the fluid from said peripheral groove.

In this way, once the protrusion has been turned over, i.e. once the hollow reserve has been formed, the articulation zone is immediately rigidified, which avoids possible stresses, to which the container would be subjected either during removal from the mold or subsequently, deforming it at the hollow reserve. This advantage is of particular interest when the container is fitted with two symmetrical hollow reserves, together forming a handle. Indeed, in this case minimizing possible deformations makes it possible to ensure the good strength of the handle during and after demolding.

Other objects and advantages of the invention will be seen from the following description with reference to the appended drawings in which:

FIG. 4 is a view similar to FIGS. 2 and 3, showing the forming unit in a boxing configuration of the container;

FIG. 5 is a partial cutaway view in another sectional plane, showing a detail of the forming unit;

FIG. 6 is a detailed view of FIG. 4, illustrating in large scale the boxing of the container;

FIG. 7 is a view in perspective showing a boxing module with which the forming unit is equipped illustrated in the preceding figures, and designed to perform the boxing of the containers;

FIG. 8 is a front cross-sectional view of the boxing module of FIG. 7, made in the plates thereof;

FIG. 9 is a partial side cross-sectional view showing the insert equipping the module of FIGS. 7 and 8, along the cutting plane IX-IX of FIG. 8;

FIG. 10 is a cross-sectional top view showing the insert along the cutting plane X-X of FIG. 9.

Figure 1:
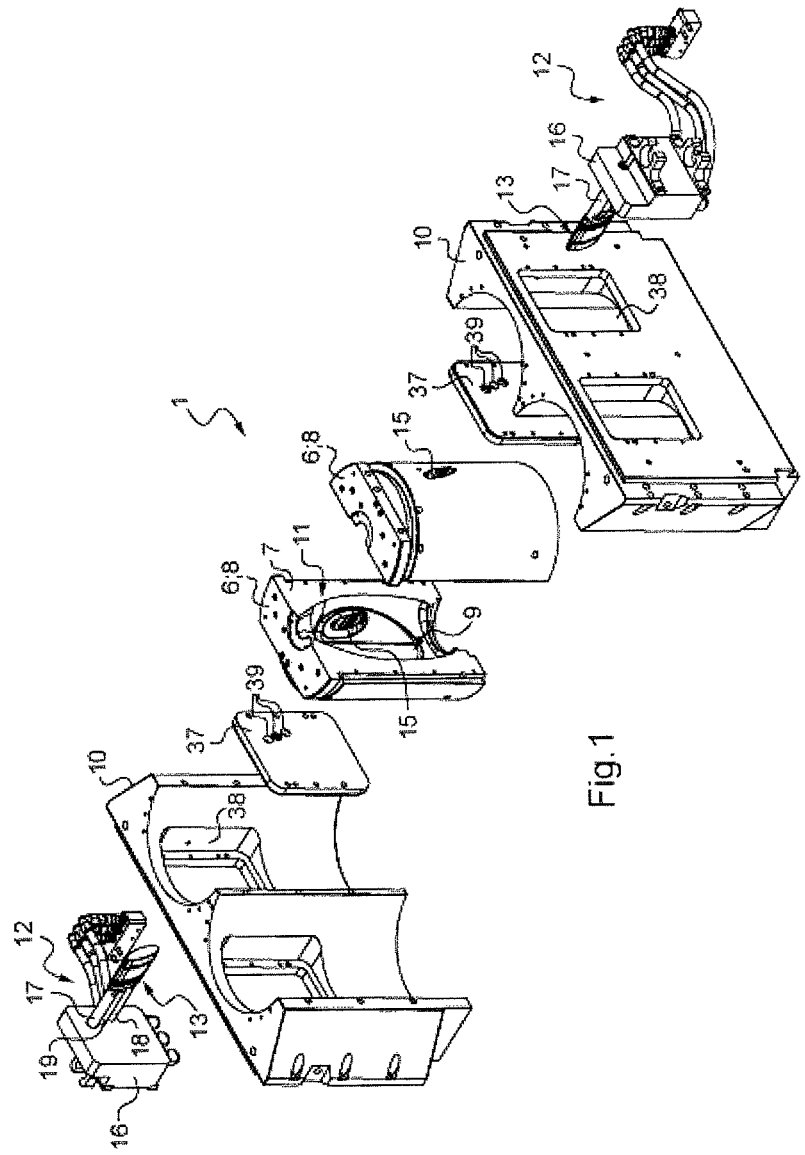
FIG. 1 is an blown-up view in perspective showing a container forming unit equipped with a device according to the invention.

Partially represented in FIG. 1 is a forming unit 1 for a machine to manufacture containers 2 from blanks 3 of plastic material such as PET (polyethylene terephthalate). The term "blank" is used here to designate intermediate containers having undergone a first series of operations in a first mold (for example pre-blowing) and intended to undergo a second series of operations in a second mold (for example blowing).

The term "forming" is used here to designate a finishing operation. In this instance, the forming unit 1 represented here is configured to perform a boxing operation on intermediate containers 3 having undergone pre-blowing and blowing operations. Upon completion of these operations, each intermediate container has on its body two symmetrical protrusions 4 the boxing of which causes them to turn over toward the interior of the container 2, and the subsequent formation of two hollow reserves 5 which together form a handle for gripping the container 2.

As represented in FIG. 1, the forming unit 1 is of the linear type and comprises a plurality of molds 6 each fitted with a wall 7 defining a cavity intended to receive a blank.

More specifically, each mold 6 comprises two mold halves 8, each fitted with a half-cavity 9. The mold halves 8 are mounted facing each other on two mold carriers 10 that are movable in horizontal transfer with respect to a fixed frame (not shown) of the forming unit 1, along a transverse direction perpendicular to a longitudinal direction of feed of the blanks, between:

a closed position in which the mold carriers 10 are brought together, the mold halves 8 being in mutual contact by a joint plane 11 and the half-cavities 9 jointly forming the cavity of the mold 6;

an open position (illustrated in FIG. 2) in which the mold carriers 10 are separated from each other to allow the evacuation of the containers 2 and the loading of the blanks 3.

For a more precise description of the kinetics, and one possible embodiment of a system to control the opening and closing of the molds 6, reference can be made to European patent No. EP 1 924 421 in the name of the applicant.

The forming unit 1 further comprises at least one boxing device 12. Said device 12 comprises a boxing insert 13 provided to push back the wall of the blank 3 at each protrusion 4 in a manner similar to a punch, in order to form, by turning over around an articulation zone or hinge 14, a hollow reserve 5 projecting toward the interior of the container 2.

In this instance, the forming unit 1, configured to accept two blanks 3, comprises two boxing devices 12 mounted facing each other, which are provided to perform a simultaneous boxing of the blank 3 on either side of the joint plane 11 and to produce two symmetrical hollow reserves 5 which together form a handle. Each boxing device 12 therefore comprises two boxing inserts 13 mounted parallel to each other and moving simultaneously.

Each insert 13, is mounted movably in transfer with respect to the corresponding half mold 8, between a retracted position in which the insert 13 is withdrawn into the wall 7 and a deployed position in which the insert 13 projects outward with respect to the wall 7.

In order to allow the passage and movement of the insert 13, each half mold 8 is provided with a recess 15 made transversely and the contour of which corresponds, allowing for operational clearance, to the surface swept by the insert 13.

The boxing device 12 is designed to allow the quick mounting and dismounting of the inserts 13 so as to allow the interchangeability of the inserts 13, either for purposes of repair, or to adapt the unit 1 to forming containers of a different shape or capacity.

In addition to the insert 13, each boxing device 12 comprises a plate 16 substantially parallelepiped in shape, on which the insert 13 is rigidly attached by means of three superimposed rods, i.e. an upper rod 17, a lower rod 18 and a central rod 19, all three anchored in an anterior face of the plate 16.

As can clearly be seen in FIGS. 7, 9 and 10, the insert 13 is produced in three adjacent sections, namely:

a base section 20, produced from a thermally conductive material, i.e. of high thermal conductivity (preferably a metallic material such as steel or an aluminum alloy) and to which are connected the rods 17, 18, 19;

an intermediate section 21, produced from an thermally insulating material, i.e. of low thermal conductivity: it will be advantageous to use a plastic material such as polyoxymethylene copolymer (POM-C), which is known as much for its thermally insulating properties as for its great mechanical strength and its good machineability;

an end section or punch 22, produced from a thermally conductive material, preferably an aluminum alloy.

As is further illustrated in FIGS. 8 and 9, the boxing device 12 is provided with a system 23 for heating the punch 22 which comprises a fluid feed line 24 and a fluid evacuation line 25, made in the plate 16 and connected to two bores 26, 27 made respectively in the upper rod 17 and in the lower rod 18 and passing through the base section 20 and the intermediate section 21 to open into the punch 22.

A duct 28, made in the punch 22, for example in the form of a groove hollowed out in the rear face thereof, connects the bores 26, 27 to allow the circulation of the fluid and the heating of the punch 22.

The heating of the punch 22 makes it possible to at least maintain the temperature of the blank 3, at its protrusions 4, at a high value (in the vicinity of the glass transition temperature) where the material is sufficiently malleable so that turning over the protrusions 4 is easy and the stresses exerted on the material does not cause unwanted deformation of the container 2.

The heat exchange fluid is for example water heated to a temperature equal to or greater than the glass transition temperature of the material of which the container 2 is composed (i.e. about 80° C. for PET).

However, in order to minimize the risks of deformation of the reserves 5 due to uncontrolled cooling of the container 2 when removed from the mold 6, the boxing device 12 is provided with a system 29 for the local cooling of the hinge 14.

Said system 29 comprises a feed line 30 made in the plate, connected to a bore 31 made in the central rod 19 and passing through the base section 20 to terminate in the intermediate section 21 near its junction with the punch 22.

The feed line 30, through a transverse hole 32, opens into a peripheral groove 33 hollowed out of the intermediate section 21 near its junction with the punch 22.

As can be seen in FIG. 7, the groove 33 is not a closed loop, but an open loop whose upstream end coincides with the hole 32 and a downstream end of which, opposite to the upstream end although physically close to it, opens into a longitudinal groove 34 hollowed out of the intermediate section 21, over the whole length thereof.

The cooling fluid (or refrigerant) is for example pressurized air, the depressurization of which, when exiting the insert 13, is accompanied by a drop in temperature.

According to a preferred embodiment illustrated in FIGS. 4 and 5, the evacuation of the refrigerant fluid is accomplished by the mold carrier 10, in which, behind the half mold 8 a compensation chamber 35 is provided, formed by a hollow recess in the mold carrier 10 beyond the cylindrical impression corresponding to a rear face 36 of the half mold 8.

Said compensation chamber 35 is sealably closed, opposite the half mold 8, by a plate 37 which seals an opening 38 made in the half mold in order to allow frontal manual access to the boxing device 12.

Said plate 37 includes three superimposed holes 39 in which the rods 17, 18, 19 are slidably mounted to allow the transfer movement of the boxing device 12. The sealing of the passage of the rods 17, 18, 19 through the holes 39 can be ensured by dynamic lip seals mounted in counter-bores formed in the plate 36 around each hole 39.

The compensation chamber 35 is delimited, facing the plate 37, by the rear face 36 of the mold carrier 8.

An oblique hole 40 made in each half mold 8 connects a zone of the recess 15, where the intermediate section 21 is located at the end of boxing at the groove 34, to the compensation chamber 35 to allow the evacuation thereto of the refrigerant fluid.

The lines 24, 25, 30 open onto a lower face of the plate 16. Connectors 41 screwed into the openings of the lines 24, 25, 30 connect said lines respectively to flexible feed and evacuation tubes 42, 43 for the heat exchange fluid, and to a flexible feed line 44 for the cooling fluid.

The pressurized gas in the compensation chamber 35 can be evacuated to the exterior by a transverse duct 45 made in the mold carrier 10 and opening into the chamber 35, as illustrated in FIG. 5. Said duct 45 is advantageously connected to a muffler (not shown), making it possible to absorb at least part of the noise due to the decompression of the chamber 35.

The method of forming containers by implementing the forming unit 1 just described can be summarized as follows.

Figure 2:
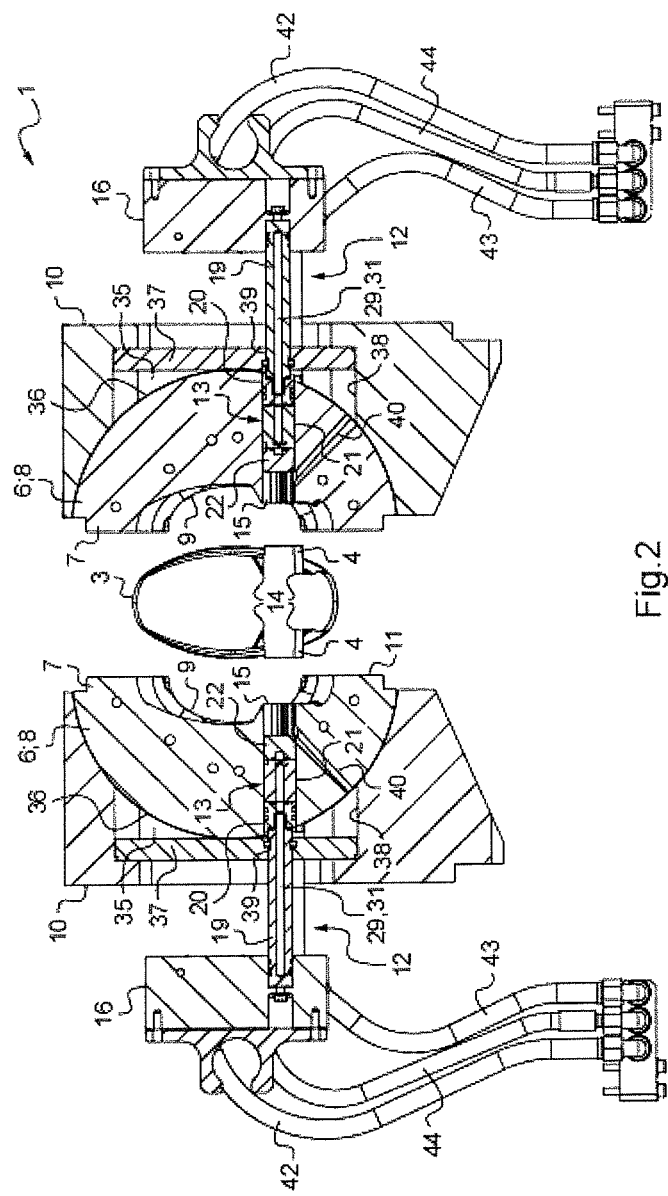
FIG. 2 is a transverse cross-sectional view of the forming unit of FIG. 1, shown in an open configuration during the loading of an intermediate container.
Figure 3:
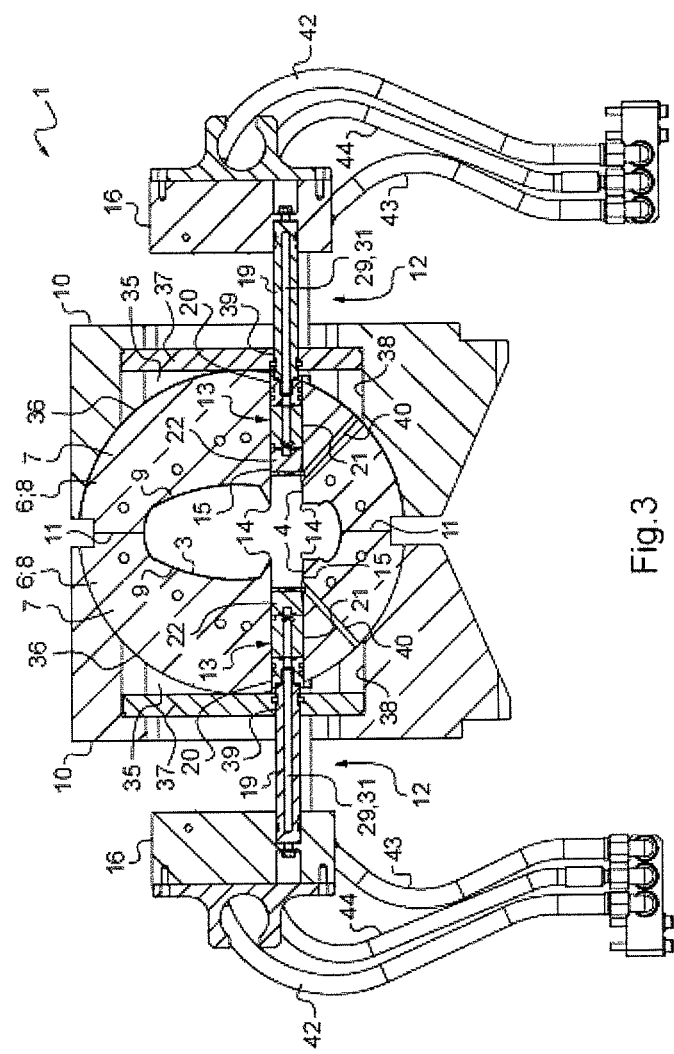
FIG. 3 is a view similar to FIG. 2, showing the forming unit in a closed configuration after the loading of an intermediate container, and prior to the boxing thereof.

The intermediate container 3 is first loaded into the mold 6, in the open position and with the inserts in the retracted position (FIG. 2). The mold 6 is then closed, the inserts 13 being maintained in the retracted position. The general shape of the intermediate container 3 corresponds to the cavity of the mold 6, the protrusions 4 being received in the recesses 15 facing the inserts 13, a short distance from (or in contact with) the punches 22.

While the heat from the inserts 22 maintains (or raises) the temperature of the protrusion material 4, the boxing operation is then initiated by which each protrusion 4 is pushed back transversely by the transfer of the corresponding insert 13 in order to form, by turning over around the hinge 14, a hollow reserve 5 projecting toward the interior of the container 2.

In the deployed position, the peripheral groove 33 of each insert 13 is located facing the hinge (FIG. 6).

Once the protrusions have been turned over (FIG. 4) the inserts are temporarily maintained in the deployed position and the refrigerant fluid is injected by the system 29.

The pressurized air then discharges through the hole 32 into the groove 33. The air, guided by the groove 33 and the wall of the recess 15, effects a peripheral circulation sweeping the hinge 14. The decompression of the air is accompanied by a drop in temperature which contributes to cooling—and thus to rigidifying—the hinge 14.

After having passed through the groove 33, the air is channeled by the groove 34 then the hole 40 to the compensation chamber 35 from which it is then extracted through the duct 45, the chamber 35 and the duct 45 thus together forming an evacuation system for the cooling air.

The separation of the heating system 23 and the cooling system 29, supplemented by the use of a thermally conductive material for the punch 22 (at which the heating is performed) and of a thermally insulating material for the intermediate section 21 (where the sweeping, and thus the cooling, is performed), makes it possible to ensure sufficient heating (or holding at temperature) of the protrusions 5 during boxing, without however preventing effective cooling of the hinge upon completion thereof.

The invention claimed is:

1. A method of forming, in a mold fitted with a wall forming a cavity, a container from an intermediate container comprising at least one lateral protrusion projecting toward the exterior of the container, the method comprising:
   a boxing operation comprising pushing back the lateral protrusion in order to form, by turning the protrusion around an articulation zone of the protrusion, the articulation zone providing a hinge around which the protrusion turns, a hollow reserve projecting toward the interior of the container; and
   a local cooling operation, after turning the protrusion around the articulation zone, comprising sweeping a circulation fluid in the articulation zone, the cooling operation performed on the exterior of the container.

2. The method according to claim 1, wherein the fluid is air.

3. The method according to claim 1, wherein the boxing operation is accompanied by an operation to heat the protrusion.

4. A device for forming a container from an intermediate container comprising at least one lateral protrusion projecting toward the exterior of the container, said device comprising:
   a mold provided with a wall defining a cavity;
   an intermediate container comprising at least one lateral protrusion projecting toward the exterior of the container and an articulation zone that provides a hinge around which the protrusion will turn when pushed back;
   a boxing insert movably mounted with respect to the mold between a retracted position in which the insert is retracted into the wall and a deployed position in which the insert protrudes with respect to the wall, toward the interior of the cavity, to push back, on the intermediate container, the lateral protrusion and to form, by turning the lateral protrusion around the hinge of the lateral protrusion, a hollow reserve toward the interior of the container;
   a peripheral groove formed on the insert and which, in the deployed position of the insert, is located facing said articulation zone wherein the groove defines an open channel on an outer surface of the insert;
   means for injecting a fluid into said peripheral groove; and
   means for extracting the fluid from said peripheral groove.

5. The device according to claim 4, wherein the insert comprises an end section produced from a thermally conductive material and an intermediate section produced from a thermally insulating material, and in that the groove is made in the intermediate section.

6. The device according to claim 5, wherein the groove is produced near a junction between the intermediate section and the end section.

7. The device according to claim 5, wherein the groove is extended by a longitudinal groove made in the intermediate section.

8. The device according to claim 4, comprising a mold carrier to which the mold is attached, and in which a fluid evacuation system is arranged in the mold carrier.

9. The device according to claim 8, wherein said evacuation system comprises a compensation chamber arranged in the mold carrier and a duct arranged in the mold carrier and opening into the compensation chamber.

10. A machine for manufacturing containers, comprising a device according to claim 4.

11. The method of forming according to claim 1, wherein the intermediate containers has undergone a pre-blowing operation prior to the boxing operation.

12. The method of forming according to claim 1, wherein the intermediate containers has undergone a blowing operation prior to the boxing operation.

13. The method of forming according to claim 1, wherein the circulation fluid is applied to the exterior of the intermediate container at the articulation zone and the hollow reserve.

14. A device for forming a container from an intermediate container comprising at least one lateral protrusion projecting toward the exterior of the container, the device comprising:
- a mold provided with a wall defining a cavity;
- an intermediate container comprising at least one lateral protrusion projecting toward the exterior of the container and an articulation zone that provides a hinge around which the protrusion will turn when pushed back;
- a boxing insert movably mounted with respect to the mold between a retracted position in which the insert is retracted into the wall and a deployed position in which the insert protrudes with respect to the wall, toward the interior of the cavity, to push back the lateral protrusion and to form a hollow reserve in the container;
- a peripheral groove formed on the insert and which, in the deployed position of the insert, is located facing said articulation zone wherein the groove defines an open channel on an outer surface of the insert;
- a conduit that injects a fluid into the peripheral groove so as to cool from an outside of the intermediate container the hollow; and
- a conduit that extracts the fluid from said peripheral groove.

* * * * *